United States Patent

[11] 3,624,460

[72] Inventor Edward M. Correll
West Columbia, S.C.
[21] Appl. No. 889,004
[22] Filed Dec. 29, 1969
[45] Patented Nov. 30, 1971
[73] Assignee General Electric Company

[54] ELECTROLYTIC CAPACITOR EMPLOYING GLASS-TO-METAL HERMETIC SEAL
8 Claims, 4 Drawing Figs.
[52] U.S. Cl. .................................................... 317/230, 29/570
[51] Int. Cl. ................................................... H01g 9/10
[50] Field of Search ...................................... 317/230, 231, 232, 233

[56] References Cited
UNITED STATES PATENTS

| | | | |
|---|---|---|---|
| 3,275,358 | 9/1966 | Shonebarger | 317/230 |
| 3,275,359 | 9/1966 | Graff | 317/230 |
| 3,275,901 | 9/1966 | Merritt et al. | 317/230 |
| 3,370,874 | 2/1968 | Scherer et al. | 287/189.365 |
| 3,461,355 | 8/1969 | Fry | 317/230 |
| 3,515,951 | 6/1970 | Krasienko et al. | 317/230 |
| 3,515,950 | 6/1970 | Koons et al. | 317/230 |

Primary Examiner—James D. Kallam
Attorneys—Nathan J. Cornfeld, John P. Taylor, Frank L. Neuhauser, Oscar B. Waddell and Joseph B. Forman ABSTRACT: An electrolytic capacitor is provided having a metal-to-glass hermetic seal assembly wherein a glass body containing an effective amount of chromic oxide is directly bonded outwardly and inwardly to a film-forming metal such as tantalum. The glass has a mean thermal coefficient of expansion which is not greater than that of the metal of the seal and does not differ therefrom substantially over a wide temperature range, thus resulting in a substantially matched or slight compression type of seal. All components of the seal exposed to contact with the electrolyte are resistant to sulfuric acid. In one embodiment, utilizing an all-welded tantalum case, a substantial reverse voltage capability is made possible. A fluorocarbon spacer ring separating the porous anode from the casing wall and a thin ceramic heat shield for protection of the anode during welding assembly of the case also provide a cushioning effect for vibration and shock resistance.

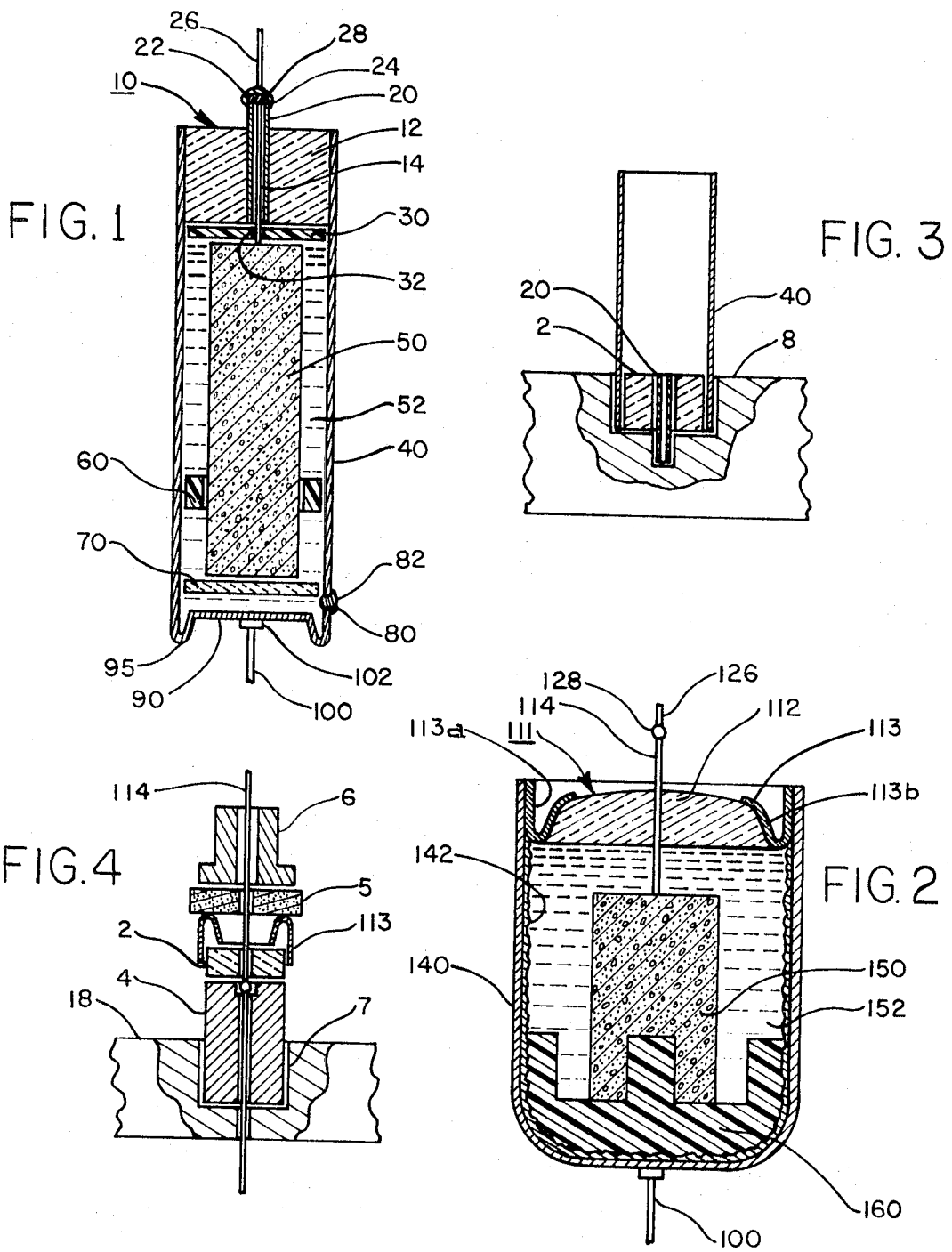

ELECTROLYTIC CAPACITOR EMPLOYING GLASS-TO-METAL HERMETIC SEAL

CROSS-REFERENCE TO RELATED APPLICATION

Glass compositions suitable for use in the seal assembly of the present invention are disclosed in copending Application Ser. No. 888,371 concurrently herewith filed in the name of William A. Graff and Jaroslaw Kohut, titled: "SEAL GLASSES," assigned to the assignee of the present invention.

FIELD OF THE INVENTION

The present invention relates to sealed assemblies of the glass-to-metal fused hermetic seal type, and more particularly to electrical devices such as electrolytic capacitors having sealed assemblies for containing corrosive electrolytes therein.

BACKGROUND OF THE INVENTION

The electrolytes commonly used in sintered pellet anode-type electrolytic capacitors contain corrosive chemicals such as sulfuric acid and lithium chloride. The end seal of the capacitor prevents leakage, loss of the electrolyte and degradation of the electrical parameters. If the electrolyte leaks out of the capacitor, not only does the performance of the capacitor suffer, but expensive surrounding equipment in which the capacitor is used may be destroyed by the leaking electrolyte. Reliability and dependability of such capacitors for long periods of use over wide ranges of temperature, and capability of withstanding thermal shock as well as mechanical vibration and stress, have long been desired aims of capacitor manufacturers.

Tantalum electrolytic capacitors of the sintered pellet anode type, usually designated as a "slug" type of tantalum electrolytic capacitor, generally contain sulfuric acid as the electrolyte. Of necessity, the containers of such capacitors are of suitable acid-resistant materials and are hermetically sealed to prevent loss of the electrolyte and entrance of contaminants. The use of such capacitors in environments wherein extremes of temperature and pressure are encountered, such as in outer space equipment for example, requires hermetic seal structures resistance not only to chemical attack by the electrolyte, but also to the temperature and pressure variations encountered in such use.

While glass-to-metal hermetic seals are used extensively in various types of electrical devices, the use of economically desirably, compact seals in tantalum electrolytic capacitors of the sintered tantalum pellet type has heretofore not been successful because of premature failure of the seal. The cause of such difficulty with prior art glass-to-metal seals has been the formation, often during the manufacture of the seal body, of undesirable reaction products at the interface between the glass and the metal parts. These reaction products were susceptible to attack by the acid electrolyte of the capacitor, and such attack has resulted in leakage at the prior art seals and early failure of the capacitors.

Prior art electrolytic capacitors containing a porous sintered anode and a wet-type electrolyte heretofore have often employed as an end seal a fluorocarbon or elastomer element and metal case crimped together. Others have utilized one or more O-rings placed under internal pressure. However, heretofore none of the prior art capacitors have been able to achieve a hermetic seal in which all components of the seal assembly which contact the electrolyte are resistant to its corrosive attack when the electrolyte contains concentrated sulfuric acid, and which components can expand and contract together so as to maintain the hermetic seal fluidtight through broad ranges of temperature and severe thermal shock.

SUMMARY OF THE INVENTION

It is therefore a principal object of the invention to provide an improved hermetic glass-to-metal seal assembly suitable for use in electrolytic capacitors without leakage over a relatively broad temperature range and which is capable of withstanding severe thermal shock.

Another object of the invention is to provide an effective hermetic metal-to-glass-to-metal seal assembly for electrolytic capacitors of the sintered tantalum pellet type having a sulfuric acid electrolyte.

A further object of the invention is to provide a method of manufacture of a hermetic seal assembly for an electrolytic capacitor wherein the film-forming metal parts of the hermetic seal remain substantially uncontaminated during the hermetic seal manufacturing process so that the metal components thereof can be anodically oxidized to form successfully a dielectric oxide film thereon suitable for capacitor use.

Further objects and advantages of the invention will become apparent from the following detailed description thereof.

To accomplish the foregoing and other objects of the invention a three-part metal-to-glass hermetic closure is provided which includes an outer and an inner metal part of a film-forming metal, each having directly fusion-sealed thereto a glass body having a particular composition of predetermined properties, the glass containing an effective amount of chromic oxide. At the interfaces between the glass and the metal parts, because of the glass compositions, no reaction products are present which could be susceptible to attack by the acid electrolyte. The glass has a mean thermal coefficient of expansion which is not greater than that of the metal parts of the seal and does not differ therefrom by more than about $15 \times 10^{-7}$ cm./cm./°C. over the temperature range of 0° to 300° C., thus resulting in a substantially matched or slight compression-type seal.

One embodiment of the invention is a capacitor of the tantalum sintered-pellet anode type with a sulfuric acid electrolyte contained within an all-welded tantalum case which forms the outer member of the metal-to-glass-to-metal seal. A tantalum eyelet tube forms the inner film-forming metal components of the seal. A fluorocarbon spacer ring separates the porous anode from the casing wall, and a thin ceramic disk, resistant to sulfuric acid, provides a heat shield for protection of the porous anode during welding assembly of the casing. The spacer ring and ceramic disk help to provide a cushioning effect for vibration and shock resistance. This capacitor has a reverse voltage capability of at least −1 volt DC at 85° C. operating temperature.

In the method of making the method of making the metal-to-glass-to-metal seal assembly of the invention, a supporting fixture made of a metal having gettering properties, such as titanium, is provided to support the outer and inner film-forming metallic parts as well as the glass body during the process of fusion-bonding the glass to the metal parts, thus keeping the film-forming metal components of the seal pure and uncontaminated so that the oxide dielectric can subsequently be formed thereon successfully.

BRIEF DESCRIPTION OF THE DRAWING

In the drawing accompanying and forming part of this specification:

FIG. 1 is a sectional view of an electrolytic capacitor having a hermetic seal according to the invention;

FIG. 2 is a sectional view of another capacitor structure embodying a glass-to-metal seal according to the invention;

FIG. 3 is a sectional view showing parts assembled in a fixture for making of the glass-to-metal seal of the device of FIG. 1; and FIG. 4 is a sectional view of parts assembled in a fixture, illustrating another method of making a glass-to-metal seal, for the device of FIG. 2.

DESCRIPTION OF THE PREFERRED EMBODIMENTS

FIG. 1 shows, in cross section, an exemplary construction of a preferred form of the device of the present invention. The illustrated capacitor comprises a hermetic seal end closure 10, containing a glass body 12 which is fusion-bonded to a tantalum eyelet tube 20, illustrated as located along the central axis of the capacitor, and also fusion-bonded to an outer casing 40 of tantalum located around the periphery of the glass body 12. Within the casing 40 there is disposed a porous tantalum sintered-pellet anode 50, immersed in an electrolyte 52 containing a 35 to 45 percent aqueous solution of sulfuric acid. A fluorocarbon (Teflon) spacer ring 60 serves to space the anode 50 from the walls of the casing 40 and to hold the porous anode 50 in axial position. A fluorocarbon insulative spacer disk 30 spaces the anode 50 longitudinally from the end closure seal 10. A tantalum lead wire 14 extending from the anode 50 passes through a tight-fitting opening 32 in the insulative disk 30 and into the metal eyelet tube 20, where the tantalum wire 14 is fixed at the end 24 of the tube 20 by a tantalum weld 22. This weld 22 serves to seal off the end 24 of the eyelet tube 20 and provides an electrical connection from the tantalum lead 20 to a solderable lead wire 26 of copper or nickel, which is fixed by a butt weld 28 to the tantalum weld 22.

The casing 40 is of all-welded tantalum construction and is closed at its lower end by means of a tantalum bottom cover member 90, welded at 95 by a tantalum weld around its periphery to the cylindrical portion of casing 40. Since tantalum metal has the extremely high melting point of 3,000° C., protective heat shield 70 is positioned between the anode 50 and the bottom cover member 90 to prevent heat damage to the anode during the welding operation which joins the cover 90 to the casing 40. The heat shield 70 remains within the casing 40 and therefore must be thin but refractory enough to protect the transmission of heat therethrough during the peripheral welding operation, but it must also be resistant to the sulfuric acid electrolyte 52 in which it remains immersed. I have found that one satisfactory material which has these desired properties is a compressed fibrous sheet ceramic material of alumina-silica composition, obtainable from the Carborundum Company, and designated as No. 970 AH "-paper."

An opening 80 is positioned in the wall of the casing 50 through which the liquid electrolyte can be introduced, after a vacuum is first applied to the assembled sealed casing. Ambient air pressure causes the acid electrolyte to flow into the vacuum in the casing 40. The opening 80 is sealed closed by means of a tantalum ball-weld, performed for example by resistance welding. The peripheral weld at 95, however, is preferably performed by tungsten inert-gas welding, or by use of an electron beam to concentrate the heat of the weld and to inhibit the heat from spreading beyond the weld joint to the anode 50 or glass body 20. A solderable cathode lead 100 of copper or nickel is welded at its formed head 102 to the bottom tantalum cover member 90 of the casing.

The all-welded tantalum case construction of the capacitor illustrated in FIG. 1 makes possible a reverse voltage capability of at least −1 volt DC at 85° C. operating temperature.

The metal-to-glass seal of the invention can also be embodied in other sealed structures. Of the known film-forming metals, when the capacitor contains a sulfuric acid electrolyte, tantalum is preferred to form the metal portion of the glass-to-metal seal, because of its resistance to sulfuric acid, its ability to be formed and drawn with ease, and because of its ability to form tantalum pentoxide as a unidirectional dielectric barrier, which makes possible the above-mentioned reverse voltage characteristics.

It should be understood that the glass-metal seal structure described herein could be employed in types of capacitors other than those shown. For example, the casing 40 could be in cylindrical, deep-drawin or cup-shaped form, with an anode of suitable type (such as would foil or sintered-pellet anode) inserted therein, the casing serving as the cathode and having a cathode terminal lead secured thereto.

In one embodiment illustrated in FIG. 2, there is shown another exemplary construction of a capacitor having a cup-shaped casing without the bottom peripheral weld of FIG. 1.

In FIG. 2 the glass body 112 of the seal assembly 111 is surrounded by a header ring 113 of tantalum metal, and a tantalum lead wire 114 passes through the glass body 112 to the porous sintered-anode pellet 150, contained within the cup-shaped casing 140. A cathode terminal lead 100 is secured to the bottom of the casing. The casing 140, depending upon the composition of the electrolyte, may be of any well-known casing cathode metal and may include tantalum, stainless steel, silver, silver alloys, nickel, titanium, aluminum, zinc, copper and the like. The inner surface of the casing 140 may also have an adherent conducting layer 142, to resist attack by the electrolyte or to enhance the cathode area, as more fully described in Application Ser. No. 736,064 of Joel B. Buice, now issued as U.S. Pat. No. 3,531,693. The porous sintered anode 150 can be any of the well-known valve metals such as aluminum, zirconium, niobium, tantalum, etc., selected in accordance with the particular application for which it is desired, the electrolyte which is used and commercial cost considerations. The anode 150 has an oxide dielectric film (not shown) formed over all surfaces thereof, as is well known in the art. The anode 150 is immersed in a liquid or gel electrolyte 152 contained in the casing 140. The electrolyte may be of any conventional or known type of capacitor electrolyte, provided that it is not corrosive to the seal components or casing surface with which it comes in contact and will be suitable for the particular capacitor application.

The cup-shaped casing 140 has a single open end which is hermetically sealed by the glass-to-metal seal 111 of the invention. Within casing 140 there is positioned a bottom spacer 160 made of a chemically resistant insulating material having low vapor transmission and moisture-absorbent characteristics, such as polytetrafluoroethylene (Teflon). Passing through the end closure 111 and extending outwardly of casing 140 is terminal lead wire 114, typically composed of tantalum, or other equivalent film-forming or valve metal having similar thermal expansion properties, and having an anodic dielectric oxide film formed thereon, the lead wire 114 being secured at its inner end to anode 150. At its outer end, terminal lead 114 is welded at 128 or otherwise joined to an external lead 126, usually composed of a solderable metal such as nickel, copper or the like. The glass-to-metal seal structure 111 which closes casing 140 at its open end provides a strong, hermetic seal, which is compatible with the electrolyte 152 and effectively prevents its escape from within casing 140 even under severe operating conditions of widely varying temperature and pressure.

The seal structure 111 comprises a metal retaining ring 113 having a rim portion 113a adapted to be secured to the adjacent wall portion of casing 140 by welding, soldering or other suitable means, and a tapered conical seal surface 113b in which the glass body 112 is received and which has an axial lead wire 114 passing therethrough, as shown, glass body 112 being fusion-sealed to ring 113 and lead wire 114, for example by the process described below in connection with FIG. 4. Where both the casing 140 and the retaining ring 113 are formed of the same metal, galvanic corrosion is avoided and metallurgical bonding is improved. It should be understood, however, that any joint between the casing 140 and the seal 111 which is appropriate, considering the proposed capacitor use and environment, may be used in conjunction with the present invention.

In the structure FIG. 2, the glass body 112 is fusion-sealed to both ring 113 and lead wire 114. Preferably, the metal seal surface portion 113b of ring 113 tapers outwardly so as to help ensure retention of the glass seal material 112 in position in the event of pressure buildup within the casing 140, in which event the tightness of the seal will be even further enhanced due to the pressure forcing the parts more intimately together. Retaining ring 113, with the glass body 112 formed therein and terminal lead 114 embedded in the latter, is joined at its rim portion 113a to the adjacent wall portion of casing 140 by welding or soldering, or other suitable means which will ensure a strong fluidtight joint.

In accordance with the invention, the glass material and the metal parts of the glass-to-metal seal have a substantially matched to slight compression relationship, the coefficient of thermal expansion of the glass body 12, 112 being not greater than that of the metal parts. Thus, the glass material of the body 12 or 112 and the respective metal parts 40 or 113, and 20 or 114 of the same corresponding seal structure will tend to expand and contract together without cracking so as to remain fluidtight through broad ranges of temperature and thermal shock. Since the glass has a coefficient of thermal expansion very close to and less than that of tantalum, it avoids the problems of differential expansion and contraction which, in the past, have made difficulties in prior types of glass-to-metal seals for such capacitors. In addition, the glass material employed in accordance with the invention provides additional benefits by virtue of its superior resistance to chemical attack by aqueous sulfuric acid electrolyte in the concentration of 35 to 45 percent sulfuric acid, as commonly used in tantalum electrolytic capacitors.

The glass compositions, set forth in detail below, has the ability of forming an intimate bond with the tantalum metal parts of the hermetic seal. The glass is applied as an annular glass preform and melted, and as the glass cools from the molten state during the fusion operation it bonds to the metal or to a preformed tantalum pentoxide film which may form thereon.

Glasses for the present invention preferably have compositions approximately in the following ranges in percent by weight:

| | |
|---|---|
| $SiO_2$ | 63–65 % |
| $Al_2O_3$ | 2–3 % |
| $Na_2O$ | 2–3 % |
| $K_2O$ | 6–8 % |
| CaO | 0–2 % |
| BaO | 4–6 % |
| $Cr_2O_3$ | 0.2–1.0% |
| $B_2O_3$ | 15–17 % |

A coloring material, such as about 0.5 percent cobalt oxide may also be added, if desired.

Glasses of the invention have coefficients of thermal expansion preferably in the range of about 51 to $57 \times 10^{-7}$ cm./cm./°C. in the temperature range of 0° to 300° C.

The following are specific examples of compositions of the above glass which have proved satisfactory.

EXAMPLE 1

The glass was produced from a batch having the composition in parts by weight of:

| | | |
|---|---|---|
| Silica sand | 3,153 | Parts by Weight |
| Aluminum oxide | 151 | |
| Sodium carbonate | 172 | |
| Potassium carbonate | 593 | |
| Boric oxide | 863 | |
| Barium carbonate | 257 | |
| Calcium carbonate | 180 | |
| Chromic oxide | 50 | |

When these proportions are measured in grams, this batch after mixing can be melted in a platinum-rhodium crucible in the air atmosphere electric furnace at a temperature between 1,482° and 1,510° C. to produce about 5,000 grams of glass. The theoretical composition of glass, as calculated from the batch in weight percent, is 63 percent $SiO_2$, 3% $Al_2O_3$, 2% $Na_2O$, 8% $K_2O$, 17% $B_2O_3$, 4% BaO, 2% CaO, and 1% $Cr_2O_3$. The glass has the following approximate physical properties:

| | |
|---|---|
| Softening point | 776°±15° C. |
| Annealing point | 585°±15° C. |
| Strain point | 548°±15° C. |
| Coefficient of Expansion (0°–300° C.) | $56.3 \times 10^{-7} \pm 2.0 \times 10^{-7}$ |
| Sealing temperature | Below 1,000° C. |
| Color | Dark green |

The glass forms a satisfactory hermetic fused seal with tantalum, which has an expansion coefficient of about $66 \times 10^{-7}$ cm./cm./°C. The coefficient of expansion of the glass should be somewhat lower than that of tantalum in order to provide a slight compression-type seal.

Various examples of glasses of the invention found to make suitable seals to tantalum are listed in table I below along with their coefficients of expansion.

TABLE I

| | Composition: Percent by Weight | | | |
|---|---|---|---|---|
| Oxide | 1 | 2 | 3 | 4 |
| $SiO_2$ | 63.0% | 62.6% | 64.0% | 65.0% |
| $Al_2O_3$ | 3.0 | 3.0 | 3.0 | 3.0 |
| $Na_2O$ | 2.0 | 2.0 | 2.0 | 2.0 |
| $K_2O$ | 8.0 | 8.0 | 7.0 | 6.0 |
| CaO | 2.0 | 2.0 | 2.0 | 2.0 |
| BaO | 4.0 | 4.0 | 4.0 | 4.0 |
| $Cr_2O_3$ | 1.0 | 1.0 | 1.0 | 1.0 |
| $B_2O_3$ | 17.0 | 16.9 | 17.0 | 17.0 |
| CoO | — | 0.5 | — | — |
| Coef. of exp. ($\times 10^{-7}$) | 56.3 | 58.7 | 55.1 | 51.7 |

The above-listed coefficients of thermal expansion of the glass material compositions of table I are all less than, but approximate closely that of tantalum, which is about $66 \times 10^{-7}$ cm./cm./°C.

FIG. 3 illustrates a preferred method of making a hermetic metal-to-glass seal of the type illustrated in the capacitor shown in FIG. 1 of the drawing. To form a glass-to-metal seal useful in a tantalum capacitor, for example, the glass may be crushed to a powder, mixed with a binder, pressed to form an annular glass preform pellet, then heated first to completely volatilize the binder and then further heated to sinter the glass particles of the pellet together. As illustrated in FIG. 3, a tantalum eyelet tube 20, an annular glass preform 2 having a glass composition such as shown in table I, and the tantalum tube 40, which will form part of the capacitor case, are positioned as shown in concentric receiving recesses formed in the fixture 8, which is made of a getter metal, such as titanium. The fixture is provided to support the outer and inner film-forming metallic parts as well as the glass body during the fusion-bonding of the glass to the metal parts. The purpose of this fixture being of getter metal is a key feature of the method of the invention, because it serves to keep the tantalum parts 20, 40 of the seal pure and uncontaminated, since the getter metal of the fixture draws impurities away during the seal-forming process and prevents contamination of the tantalum metal, so that an oxide dielectric layer can successfully be formed subsequently, by usual electrochemical anodizing on the metal parts of the hermetic glass-to-metal seal.

FIG. 4 of the drawing illustrates a method of making a glass-to-metal seal having a header ring of the type illustrated in the capacitor of FIG. 2. As shown in FIG. 4, a tantalum header ring 113, a tantalum current leading-in wire 114, and annular pressed glass preform 2 having a composition as shown in table I, are positioned in a retaining fixture 18 with the tantalum wire extending through the center of the preform and the preform supported concentrically in the tantalum header 113. The glass preform 2 may be covered by a graphite cap 5. A getter body 6 of tantalum, or preferably titanium, is positioned around the wire 114 and close to the header ring 113. The header, and to a certain extent, the graphite pedestal 4 on which the parts rest, as well as the graphite cap 5, are all supported within a recess 7 of the steel retaining fixture 18. A vacuum is applied to exhaust the air, the entire assembly is heated in a furnace, first to a temperature of 650° for about 20 minutes for degassing, and then in an atmosphere of argon to a temperature of about 1,000° C. for about 30 to 45 minutes to fusion-bond the glass to the metal members. The glass-to-metal seal assembly is then cooled to room temperature in the argon gas atmosphere. The tantalum header ring 113 is then circumferentially welded to the metal container 140 of the capacitor to hermetically seal the latter.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What is claimed as new and desired to be secured by Letters Patent of the United States is:

1. An electrolytic capacitor comprising:
   a. a tantalum cathode casing having an open end;
   b. an electrolyte in said casing containing about 35 to 45 percent sulfuric acid;
   c. a sintered porous anode formed of a film-forming metal having a dielectric film thereon in said casing and immersed in said electrolyte, said anode having a terminal lead extending through said open end, and
   d. a metal-to-glass-to-metal closure hermetically sealing the open end, said closure comprising film-forming metal and a glass composition having substantially immunity from attack by said sulfuric acid; a coefficient of thermal expansion not greater than that of said metal nand differing therefrom by not more than about $15\times10^{-7}$ cm./cm./°C. over the temperature range of 0° to 300 C.; and an approximate composition of from 63 to 65% $SiO_2$, 2 to 3% $AL_2$ to 3% $Na_2O$, 6 to 8% $K_2O$, 0 to 2% CaO, 4 to 6% BaO, 0.2 to 1.0% $Cr_2O_3$ and 15 to 17% $B_2O_3$.

2. A capacitor according to claim 1, said closure including metal means of tantalum fusion-bonded to the glass of the closure, said casing forming one of said metal means, whereby the capacitor has a substantial reverse voltage capability.

3. An assembly according to claim 2, further including a ceramic shield disk member disposed between said porous anode and the bottom end of the casing, said ceramic member being of a material substantially immune from attack by said sulfuric acid.

4. An assembly according to claim 1, further including spacer ring means around said porous anode to insulate same from said casing.

5. An electrolytic capacitor comprising:
   a. a tantalum cathode casing having at least one open end;
   b. a sulfuric acid electrolyte in said casing;
   c. a porous anode of sintered tantalum having a dielectric film thereon in said casing and immersed in said electrolyte said anode having a terminal lead extending through said one open end; and
   d. a tantalum-to-glass-to-tantalum closure hermetically sealing said one open end, said closure consisting essentially of an annular glass member fusion bonded to inner and outer tantalum metal means and having a glass composition characterized by:
      1a substantial immunity from attack by said sulfuric acid;
      2. a coefficient of thermal expansion not greater than that of tantalum and differing therefrom by not more than about $15\times10^{-7}$ cm./cm./°C. over a temperature range of 0° to 300° C; and
      3. an approximate composition of from: 63–65 $SiO_2$, 2 to 3% $Al_2O_3$, 2 to 3% $Na_2O$, 6 to 8% $K_2O$, 0 to 2% CaO, 4 to 6% BaO, 0.2 to 1.0% $Cr_2O_3$, and 15 to 17% $B_2O_3$.

6. An assembly according to claim 5, said inner metal means including a terminal lead of tantalum extending outwardly from said electrical component and passing through said end opening of the casing.

7. An assembly according to claim 5, said inner metal means including an eyelet tube of tantalum passing through and fusion bonded to said glass material, and a terminal lead of tantalum within said tube extending outwardly from said electrical component and sealed to the outer end of said eyelet tube.

8. An assembly according to claim 5, said outer metal means comprising a header ring of tantalum fixed to said casing.

* * * * *